March 26, 1968     T. V. TYLER     3,374,957

FLUID FLOW CONTROL DEVICE

Filed June 3, 1965     3 Sheets-Sheet 1

INVENTOR.

March 26, 1968   T. V. TYLER   3,374,957
FLUID FLOW CONTROL DEVICE
Filed June 3, 1965   3 Sheets-Sheet 2
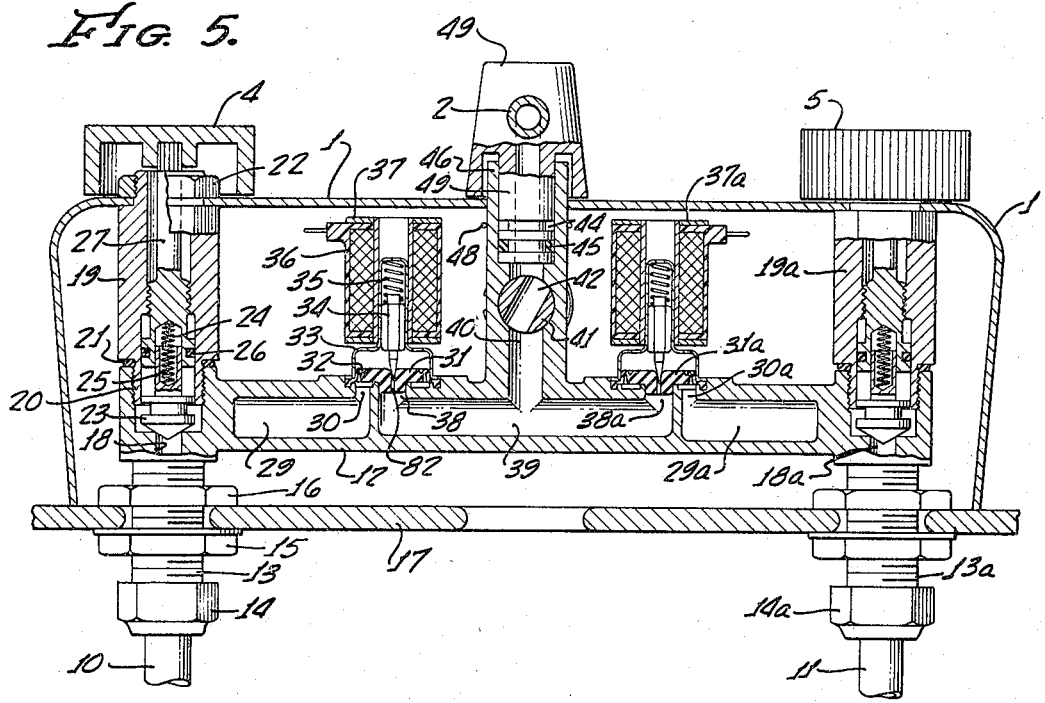
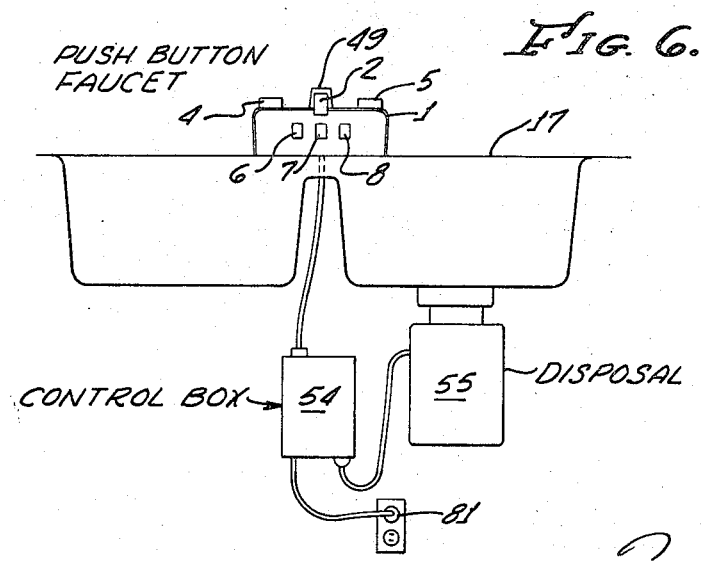
INVENTOR.

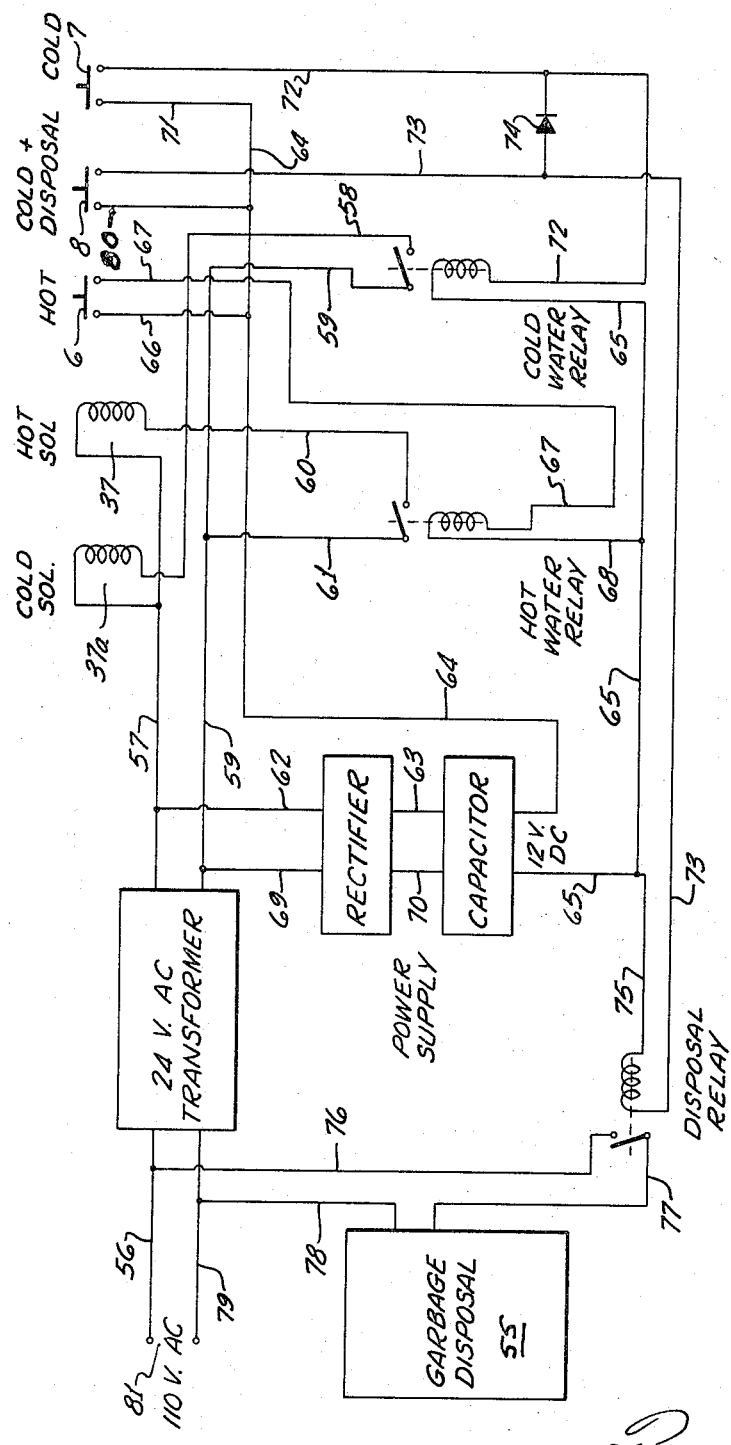

United States Patent Office 3,374,957
Patented Mar. 26, 1968

3,374,957
FLUID FLOW CONTROL DEVICE
Truman V. Tyler, Palos Verdes Estates, Calif.,
assignor to Sierra Financial Corporation
Filed June 3, 1965, Ser. No. 460,977
5 Claims. (Cl. 241—33)

ABSTRACT OF THE DISCLOSURE

Electrical solenoids are placed in hot and cold water lines and such solenoids are actuated by push button controls to control the hot and cold water flow to a water faucet. The cold water control is interconnected with the control for a garbage disposal unit so as to provide simultaneous operation of the cold water with the disposal unit upon the actuation of a single control.

---

This invention relates to a new and improved water dispensing fixture and control means therefor. The invention more particularly relates to a fluid control device in combination with a garbage disposal unit and means for simultaneously controlling the operation of the garbage disposal unit and the flow of fluid.

It is an object of this invention to control the flow of hot and cold water from a water dispensing fixture by means of electrical push buttons.

It is a further object of this invention to provide a fixture for dispensing water at a pre-selected temperature by electrical push button control means.

It is still a further object of this invention to provide a water dispensing fixture in combination with a garbage disposal unit and so interconnected that cold water flows whenever the garbage disposal unit is operated.

Figure 1:
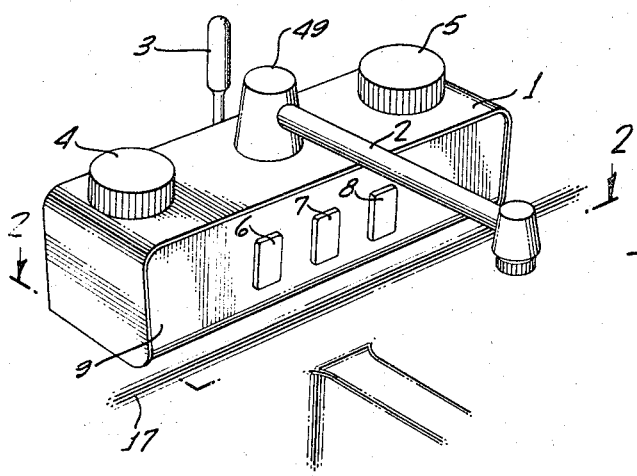
Figure 2:
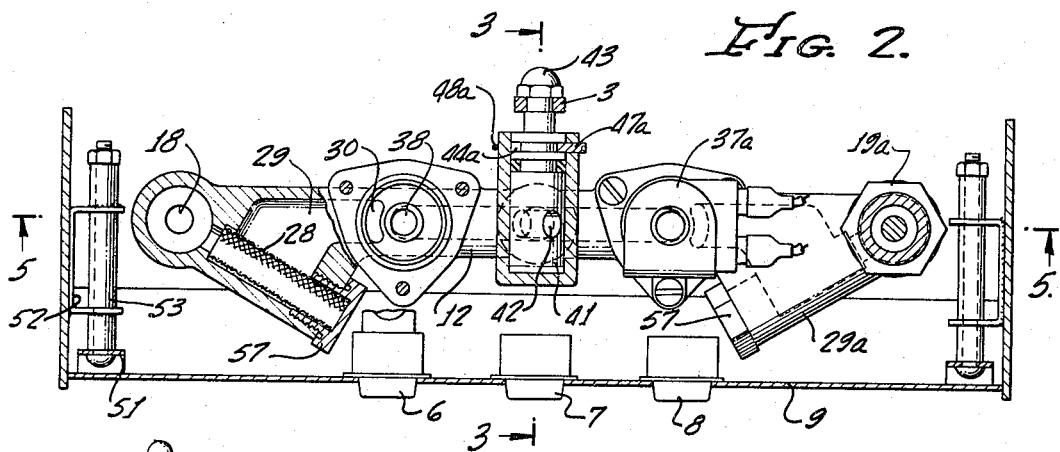
Figure 3:
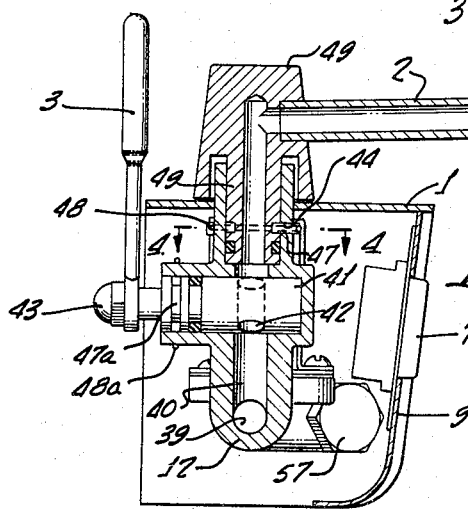
Figure 4:
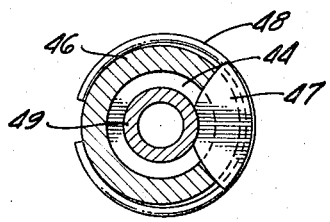

Still further objected of invention will become apparent from the following description taken in connection with the accompanying drawings in which:

FIG. 1 is a perspective view of the fixture;
FIG. 2 is a cross-section along the line 2—2 of FIG. 1;
FIG. 3 is a cross-section along the line 3—3 or FIG. 2;
FIG. 4 is a cross-section along the line 4—4 of FIG. 3;
FIG. 5 is a cross-section along the line 5—5 of FIG. 2;
FIG. 6 is a schematic arrangement of the unit applied to a kitchen sink showing the attachment to the control box and the garbage disposal unit; and
FIG. 7 is a wiring diagram for the electrical system for the unit.

Referring to the drawings, my invention is shown generally in FIG. 1 associated with a kitchen sink.

From casing 1 there is shown a swing spout 2 from which water flows in response to push button 6 for hot water, 7 for cold water and 8 for simultaneous operation of the garbage disposal unit and the flow of cold water. Push buttons 6, 7 and 8 are carried by a panel 9 suitably attached to casing 1 by brackets 51 and 52 and bolt 53, as shown in FIG. 2.

Knob 4 adjusts the volume flow of hot water and knob 5 the volume flow of cold water whereas the total flow of hot and cold or a combination of hot and cold water is adjusted by lever 3 in a manner to be more fully explained hereinafter.

Referring to FIG. 5, casing 1 encloses a valve body 12 from which extends threaded pipe segments 13 and 13a to which are attached by nuts 14 and 14a a hot water tube 10 and a cold water tube 11 connected respectively to a source of hot and cold water.

The arrangement for controlling the flow of hot water from tube 10 to swing spout 2 is identical with that for controlling flow of cold water from tube 11 to the swing spout. Accordingly, only one such arrangement will be fully described.

Threaded pipe section 13 is fastened to sink 17 by nuts 15 and 16. This likewise fastens valve body 12 and casing 1 to the sink.

Flow of hot water is controlled electrically by solenoid 37 in the following manner. Poppet valve 23 closes opening 18 when the solenoid is in the down position as shown in FIG. 5 with diaphragm 31 closing passageway 38. However, when the solenoid is energized by push button 6, diaphragm 31 is raised along with poppet valve 23 to permit flow of water from tube 10 through opening 18, screen 28 (FIG. 2) passageway 29, opening 30, opening 38, passageways 39 and 40, through adjustable opening 42 into swing spout 2.

Poppet valve 23 is carried by a fitting housing 19 having a portion 20 adapted to be screw threaded into corresponding screw threads of the valve body. A washer 21 seals the connection of the fitting housing 19 to the valve body. Nut 22 which fits inside hollow knob 4 fastens the fitting housing to the casing 1. Stem 27 is adjustably screw threaded inside the fitting housing and fastened to knob 4 for adjustment thereby. Stem 27 is provided with an opening 24 for carrying a spring 25 adapted to maintain poppet valve 23 in extended position. A seal 26 prevents leakage from around the stem.

Solenoid 37 is provided with a coil winding 36, a spring 35 for holding armature 34 in the down position and a casing 33 for slidably receiving diaphragm 31 which in turn is provided with an orifice 32 to apply water pressure to the upper side of the diaphragm to hold it in closed position. Screen 28 is removable for replacement and cleaning purposes by screw threaded cap 51.

Swing spout 2 is readily releasibly connected to a cylindrical extension 46 of the valve body 12 as shown in FIG. 3. A cylindrical slot 44 is provided in the cylindrical extension of the member 49 which extends into member 46. A retainer 47 is inserted into an opening in member 46 as shown in FIG. 4 and retained therein by spring ring 48 thereby permitting member 49 to rotate within member 46 but nevertheless being readily and easily detachable therefrom. Seal 45 prevents leakage.

The volume of flow desired may be set by lever 3 which is attached by nut 43 to a cylindrical member 41 which in turn is rotatably fitted within a corresponding cylindrical portion of the valve body as shown in FIGS. 3 and 5. Member 41 is provided with an opening 42, the size of which can be adjusted as shown in FIG. 5 by moving lever 3 in either direction. Member 41 is retained within the cylindrical portion of the valve body by a slot, retainer and clip arrangement 44a, 47a and 48a which is identical with the arrangement shown in FIG. 4.

It is to be understood that solenoid 37a controls the flow of cold water from tube 11 through openings 18a, 29a, 38a and to 39 in the same manner as 37 controls the flow of hot water.

It is also to be understood that the valves for adjusting the flow of hot and cold water, including the poppet valve 23, fitting housing 19 and adjusting mechanism, may be eliminated and an adjusting valve placed in lines 10 and 11. Opening 18 would then connect directly to opening 29 and opening 18a directly to 29a.

Referring now to the electrical means for controlling the flow of hot and cold water and for simultaneously causing the flow of cold water whenever the garbage disposal unit is operating, FIG. 7 shows a diagrammatic wiring arrangement for accomplishing this purpose in which a source of power is indicated at 81 of 110 v. AC. Conductor wires 56 and 79 lead to a 24 v. AC transformer. Garbage disposal 55 is electrically connected to the 110 v. AC source 81 by wires 76, 77 and 78 through a disposal relay or switch as shown.

Conductor lead 57 connects the transformer to cold water controlling solenoid 37a and hot water controlling solenoid 37. Solenoid 37a is connected to cold water relay or switch by conductor wire 58, the circuit to the transformer being completed by conductor wire 59. Coil 37 is connected by conductor wire 60 to hot water relay or switch, the circuit to the transformer being completed by conductors 61 and 59.

24 v. electrical current is transmitted to the power supply comprising the rectifier and capacitor by conductor wires 62, 69 and 63, 70 from which it emerges as 12 v. DC. Conductor wire 64 is connected by wire 66 to one side of push button switch 6 by 80 to one connection of push button switch 8 and by 71 to one side of push button switch 7. The other connection of switch 6 is connected by wire 67 to the hot water relay; the other connection of switch 7 by conductor 72 to the cold water relay; and one connection of switch 8 to disposal relay by conductor 73. Conductor wires 72 and 73 are connected by a diode 74 which permits current to flow from 73 to 72 but does not permit it to flow from 72 to 73. Conductor 65 from the rectifier-capacitor power supply completes the circuit to the cold water relay and to the disposal relay by conductor 75, and to the hot water relay by conductor 68. The electrical units and wiring, except for lead wires, are contained in a control box 54, FIG. 6.

In the operation of the device, knobs 4 and 5 are adjusted to permit the desired flow of hot and cold water to the swing spout when either the hot or cold water push button is pressed and to provide the desired pre-determined mixture of hot and cold water when both push buttons 6 and 7 are pressed. Lever 3 is moved to the right or left of center as desired to provide a pre-determined volume flow of water from spout 2.

To provide a flow of cold water, push button 7 is pressed, the cold water relay or switch, which may be a latching relay such as that described in Patent No. 2,531,838, is operated and solenoid 37 is energized to raise armature 34 thereby relieving pressure on the upper side of the diaphragm 31 thereby allowing water pressure from tube 10 to raise the diaphragm and poppet valve 23 to an open position and allow water to flow through opening 18, thence through screen 28 into passageway 29, openings 30, 38, 39, 40 and 42 to exit through spout 2.

Push button 6 operates the hot water relay, which may be a latching relay similar to that used for the cold water relay, to cause solenoid 37 to raise, thereby permitting diaphragm 31a to be raised and allow water to flow through openings 18a, 29a, 30a, 38a, 40, 42 and out through spout 2. To shut off the cold water flow, it is only necessary to again push button 6 to cause actuation of the cold water relay which in turn actuates the solenoid 37 to cause armature 34 to close the opening 82 in diaphragm 31 to thereby build up pressure on the upper side of the diaphragm to move it to closed position. By pushing button 7, diaphragm 31a is similarly caused to move into closed position. The hot and cold water relays used may be commercially available latching relays such as the Model #1550A relay manufactured by the Touch Plate Manufacturing Co., Long Beach, Calif. This type of relay successively latches in closed and open positions in response to succeeding current pulse actuations of its coil.

When a flow of mixed hot and cold water is desired, it is only necessary to push both buttons 6 and 7. The flow of either or both hot and cold water can be terminated by again pushing either or both buttons 6 and 7.

Operation of the garbage disposal unit together with simultaneous turning on of the cold water is achieved by pushing button 8 which actuates the disposal relay since electricity which flows through diode 74 also actuates the cold water relay. The relay is actuated into position to shut off the garbage disposal unit and the flow of water by again pushing button 8.

The arrangement of the circuit provides 110 v. AC directly to the garbage disposal unit, 24 v. AC to the hot and cold water solenoid valves and 12 v. DC to the push button switches and to one side of the hot and cold water relays and the disposal relay. The circuit arrangement permits the selective operation of the hot water solenoid by push button switch 6, the cold water solenoid by push button 7, and the combined operation of the cold water solenoid and the garbage disposal unit by switch button 8. As shown in FIG. 7, the garbage disposal unit is connected directly to the 110 v. AC source. Current from the 24 v. AC transformer connects directly to the hot and cold water solenoid 37 and 37a and push button switches 6, 7 and 8 connect directly to the hot water, cold water and disposal relays or switches. By means of the electrical connection from the power supply comprising the rectifier and capacitor to the push button switches and their connected relays and the use of the diode 74 located between conductor wire 73 and 72 there is provided an arrangement whereby the flow of hot and cold water may be selectively controlled and also the flow of cold water with simultaneous operation of the garbage disposal unit may be obtained. This arrangement of circuitry not only makes possible the selective controls as outlined but also provides safe low voltage switches and the use of no-hum direct current.

While there is described above the principles of this invention in connection with specific apparatus, it is to be clearly understood that this description is made only by way of example and not as a limitation to the scope of this invention.

What is claimed is:

1. A fluid flow control device comprising a valve body having a hot water connection and a cold water connection; an adjustable valve associated with said hot water connection and a second adjustable valve associated with said cold water connection for selectively regulating the flow of water into the valve body; a fluid outlet from said valve body; a solenoid operated valve between said hot water valve and said outlet, and a second solenoid operated valve between said cold water valve and said outlet; electrical means for operating said solenoid valve to cause either hot or cold, or both hot and cold water to flow into said valve body and from said outlet; and a garbage disposal unit electrically connected with one of said solenoid valves to selectively operate simultaneously therewith.

2. A fluid control device comprising a valve body having a hot water inlet, a cold water inlet and an outlet; an adjustable valve associated with said hot water inlet for controlling the flow of hot water therethrough; a second valve associated with said cold water intake for adjustably controlling the flow of cold water therethrough; a hot water solenoid valve between said hot water inlet and said outlet and a pushbutton switch electrically connected thereto for operating the same; an electrically operated garbage disposal unit; a cold water solenoid between said cold water inlet and said outlet; and a third pushbutton switch connected with said cold water solenoid and said garbage disposal unit for simultaneously operating said cold water solenoid and said garbage disposal unit.

3. A fluid control device comprising a valve body having a hot water inlet, a cold water inlet, and an outlet; a hot water solenoid valve between said hot water inlet and said outlet; a cold water solenoid valve between said cold water inlet and said outlet; a garbage disposal unit; a source of 110 v. electricity connected to said garbage disposal unit; a 24 v. AC transformer connected to said 110 v. source; an electrical connection from said transformer to said hot and cold water solenoid valves; a hot water push button switch, a cold water push button switch and a cold water-disposal switch; a 12 v. DC power supply connected to said transformer; a hot water relay connected with said power supply, said hot water solenoid and said hot water push button switch; a cold water relay connected with said power supply, said cold water solenoid and said cold water push button switch; and a disposal relay connected with said garbage disposal unit, said cold water relay and said cold water-disposal switch, whereby to obtain the selective flow of hot and cold water and the simultaneous flow of cold water and the operation of said garbage disposal unit.

4. A device as recited in claim 3 in which said transformer, power supply and relays are contained in a remotely located central box and said push button switches are closely associated with said valve body.

5. A device as recited in claim 3 and further including a diode connected between one side of said cold water push button switch and one side of said cold water-disposal push button switch, whereby operation of said cold water-disposal switch will simultaneously actuate said cold water relay and said disposal relay.

References Cited

UNITED STATES PATENTS

| | | | |
|---|---|---|---|
| 2,244,402 | 6/1941 | Powers | 241—46 |
| 2,615,176 | 10/1952 | Frank | 241—46 |
| 2,908,017 | 10/1959 | Whaley | 137—606 |
| 2,954,798 | 10/1960 | Mustee | 137—606 |
| 2,991,481 | 7/1961 | Boak | 4—1 |

GERALD A. DOST, *Primary Examiner.*